(12) United States Patent
Rajeswaran et al.

(10) Patent No.: US 9,134,761 B2
(45) Date of Patent: Sep. 15, 2015

(54) ATTACHABLE CHARGER

(76) Inventors: Lakshman Rajeswaran, Wallingford, PA (US); Thomas F Pepe, Missouri City, TX (US); Jeremy Groh, Harrisburg, PA (US); Nathan Trunfio, Conshohocken, PA (US)

( * ) Notice: Subject to any disclaimer, the term of this patent is extended or adjusted under 35 U.S.C. 154(b) by 400 days.

(21) Appl. No.: 13/605,724

(22) Filed: Sep. 6, 2012

(65) Prior Publication Data

US 2013/0057215 A1    Mar. 7, 2013

Related U.S. Application Data

(60) Provisional application No. 61/532,046, filed on Sep. 7, 2011.

(51) Int. Cl.
*H02J 7/02* (2006.01)
*G06F 1/16* (2006.01)
*H04M 1/21* (2006.01)

(52) U.S. Cl.
CPC ............... *G06F 1/1626* (2013.01); *H04M 1/21* (2013.01); *G06F 2200/1633* (2013.01)

(58) Field of Classification Search
USPC .......................................... 320/111, 114, 160
See application file for complete search history.

(56) References Cited

U.S. PATENT DOCUMENTS

2003/0218445 A1 * 11/2003 Behar ........................... 320/114
2005/0184705 A1 *  8/2005 Gawell et al. ................. 320/160
2006/0197495 A1 *  9/2006 Bumiller ....................... 320/111

* cited by examiner

*Primary Examiner* — Brian Ngo
(74) *Attorney, Agent, or Firm* — Wilson Daniel Swayze, Jr.

(57) ABSTRACT

Disclosed is an attachable charger for a handheld electronic device comprising an attachable receptacle within which the device is snugly received, a power plug comprising prongs for insertion into an AC power socket, the power plug extending from the attachable receptacle, a power processing assembly for processing the power received at the AC socket into power suitable for charging the device, and a connector for connecting the processing assembly and the handheld device so as to convey the power from the processing assembly to the device.

14 Claims, 11 Drawing Sheets

ATTACHABLE CHARGER

CROSS-REFERENCE TO RELATED APPLICATIONS

This application claims benefit of priority of U.S. Provisional Patent Application Ser. No. 61/532,046, filed Sep. 7, 2011, entitled " CASE FOR ANY ELECTRONIC DEVICE THAT HOUSES THE CHARGING CORD, BATTERY, AND OR USB ADAPTOR WITH PRONGS VIA A DEEPENED CHANNEL OR EXTENSION IN CASE", owned by the assignee of the present application and herein incorporated by reference in its entirety.

BACKGROUND

The present invention relates to accessories for electronic handheld devices and more particularly to a charger that can be coupled to the device such that, the charger can be carried along with the device.

It's no news that wireless handheld devices such as cellular phones, tablets, and the like, are an indispensible part of peoples' lives today. Generally, these devices have a battery life that lasts around eight to nine hours and have a talk time of roughly four hours. And, owing to our increased attachment to these devices, it is always quite an inconvenience if these devices run out of charge especially, when a charging means thereof is not around. For those who cannot afford to have their devices "die" due to lack of charge, they are obligated to carry along the charging means, such as a travel adapter or a USB cable, in order to ensure that the battery is always backed up. However, carrying a travel adapter or a USB cable separately in itself can be quite a handful for the user. Also, adding fuel to the fire is that fact that, these cables and wires can be unmanageable as they get tangled up quite easily and quite often. There is surely a necessity in the art for a solution that can address aforementioned problem.

SUMMARY

The present invention comprises an attachable charger that is adapted to be used in conjunction with wireless handheld devices such as a cellular phone, tablet, and the like. The charger comprises an attachment receptacle within which the device is received whereby, the charger becomes one with the device enabling the user of the device to carry the charger along with the device. The attachment receptacle comprises a power plug extending out of the exterior of the attachment receptacle, the plug for insertion into an AC electrical power socket, a power processing assembly disposed within the attachment receptacle, the processing assembly for converting the power received by the plug into an electrical output suitable for charging the device, and a connector extending out of the attachment receptacle towards the interior of the attachment receptacle, the connector adapted to be received within the charging port of the device so as to convey the power from the processing assembly to the device.

The other objects and advantages of the embodiments herein will become readily apparent from the following detailed description taken in conjunction with the accompanying drawings.

BRIEF DESCRIPTIONS OF THE DRAWINGS

FIGURES—REFERENCE NUMERALS

10 Attachable Charger
12 Electronic Wireless Handheld Device
14 Front Frame Member
16 Rear Wall Member
18 Sidewall Member
20 Opening
22 Interface Window
24 Power Plug
26 Prong
28 Groove
30 Power Processing Assembly
32 Step-down Transformer
34 Rectifier
36 Printed Circuit Board
38 Connector
40 Charging Port
42 Charger Port
44 Cable Receptacle

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
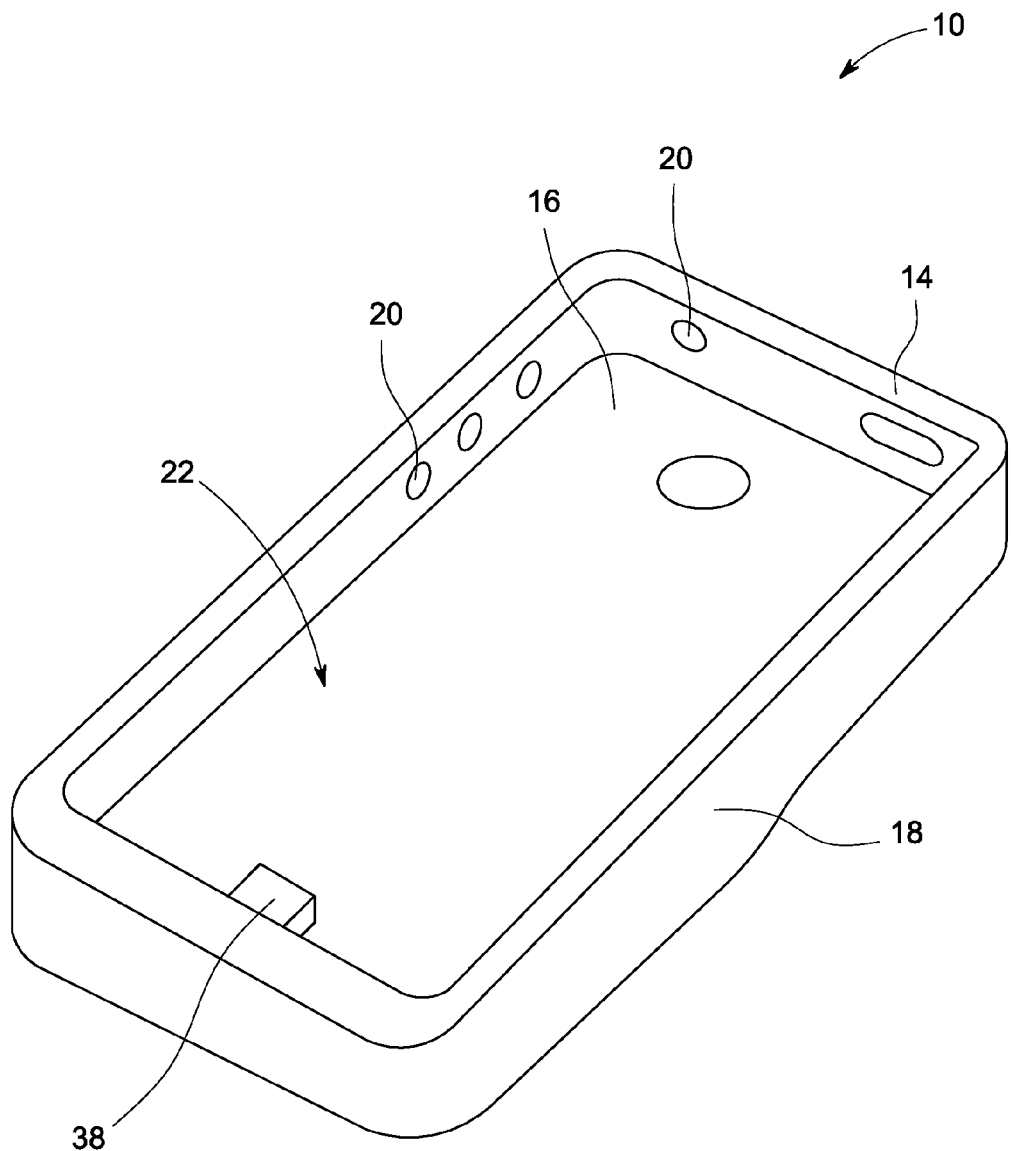
FIG. 1 is a top perspective view of the attachable charger according to the preferred embodiment of the present invention.
Figure 2:
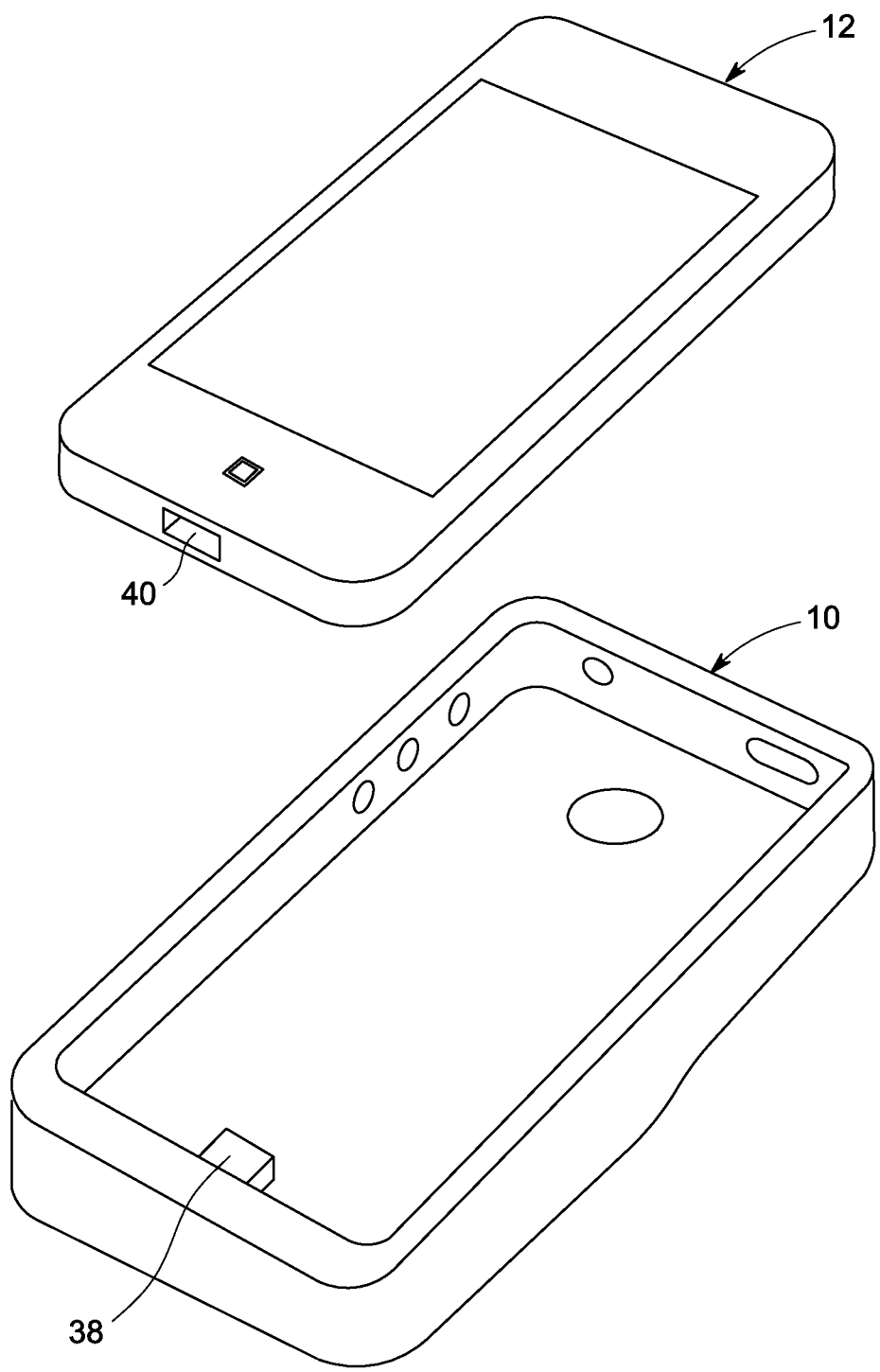
FIG. 2 is an exploded view of the attachable charger and the device according to the preferred embodiment of the present invention.
Figure 3:
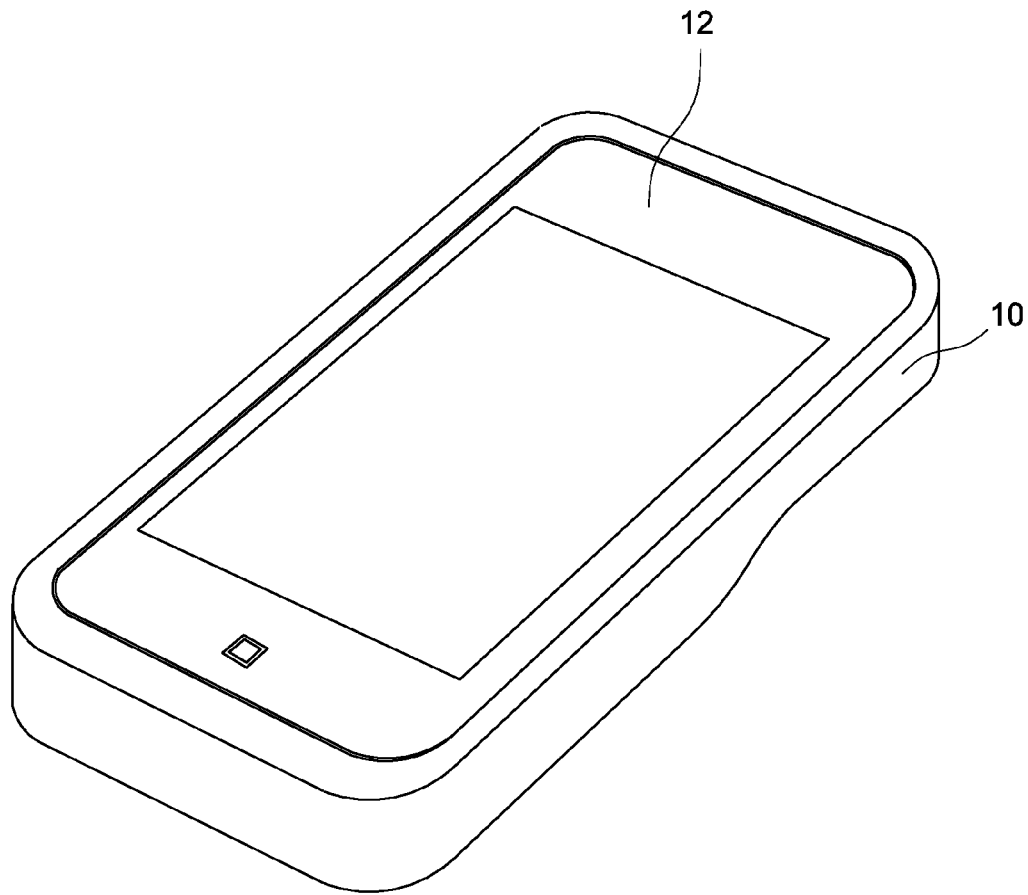
FIG. 3 is a top perspective view of the attachable charger coupled to the device according to the preferred embodiment of the present invention.

Referring to FIGS. 1 through 5, the present invention comprises an attachable charger 10 designed to be used in conjunction with a wireless handheld electronic device 12 such as a cellular phone, tablet, and the like, so as to enable the user of the device 12 to carry the charger 10 along with the device 12. The charger 10 comprises an attachment receptacle, which acts as an attachment means for the device 12 wherein, the attachment receptacle is adapted to receive the device 12 therewithin (as seen in FIGS. 2 and 3) whereby, the charger 10 becomes one with the device 12. The attachment receptacle comprises a substantially rectangular front frame member 14, a substantially rectangular rear wall member 16, and four substantially rectangular sidewall members 18 extending between the four edges of the front frame member 14 and the rear wall member 16 so as to form a substantially rectangular housing as seen in the referred drawings. The attachment receptacle is adapted to snugly receive the device 12 therewithin (as seen in FIG. 3) such that, the front and rear exterior surfaces of the device 12 abut the interior surfaces of the front frame member 14 and the rear wall member 16 respectively. As it is apparent from the referred drawings, the attachment receptacle also acts as a casing for the device 12 (see FIG. 3) for protection against potential damages due to abrasion, shock, dings, drops, and etc. The attachment receptacle 10 further comprises a plurality of openings 20 on the front, rear, and the sides thereof for providing access for various ports, such as a charging port, USB port, etc, various controls, such as a volume control, lock key, etc, and various other features of the device, such as the camera, projector, etc.

Figure 6:
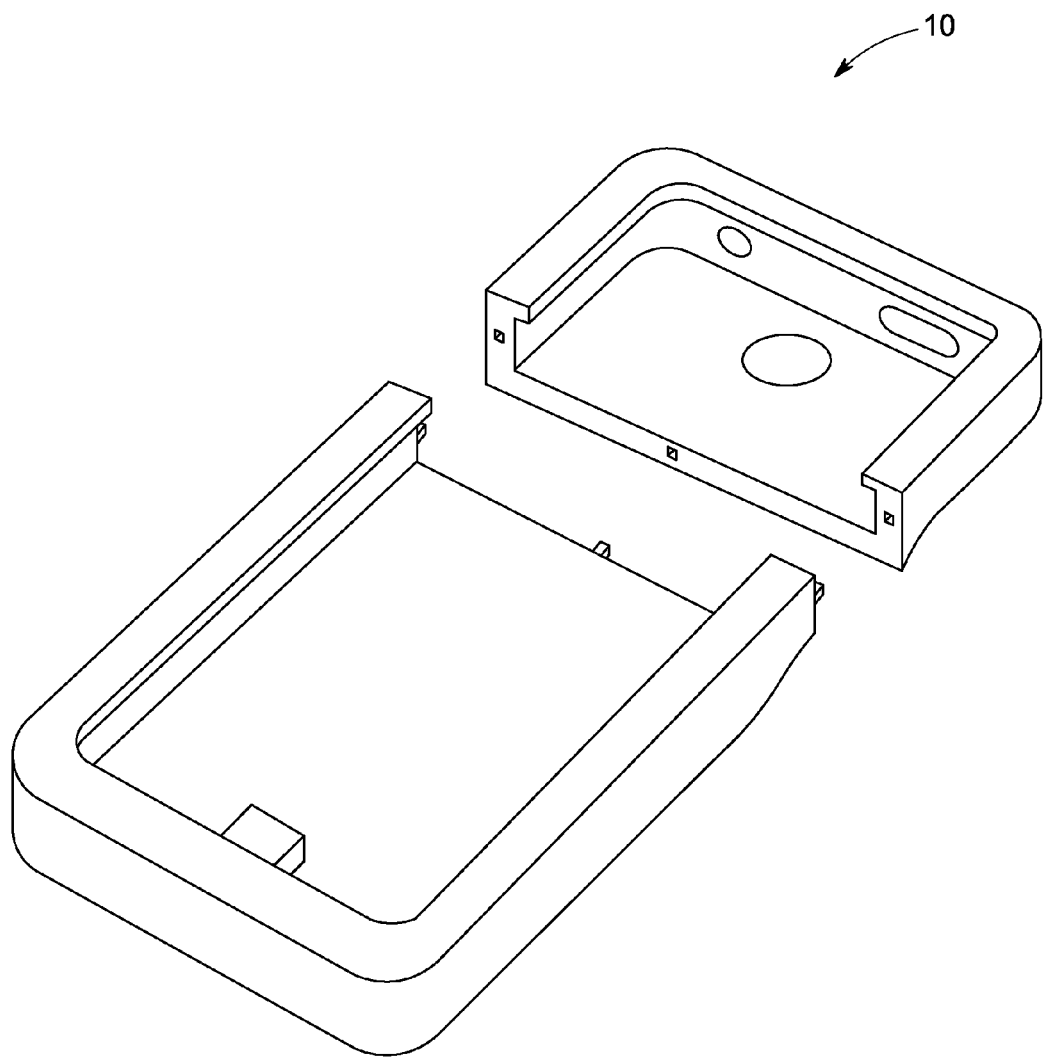
FIG. 6 is a top perspective view of an embodiment of the attachable charger that comes apart longitudinally according to an alternate embodiment of the present invention.
Figure 7:
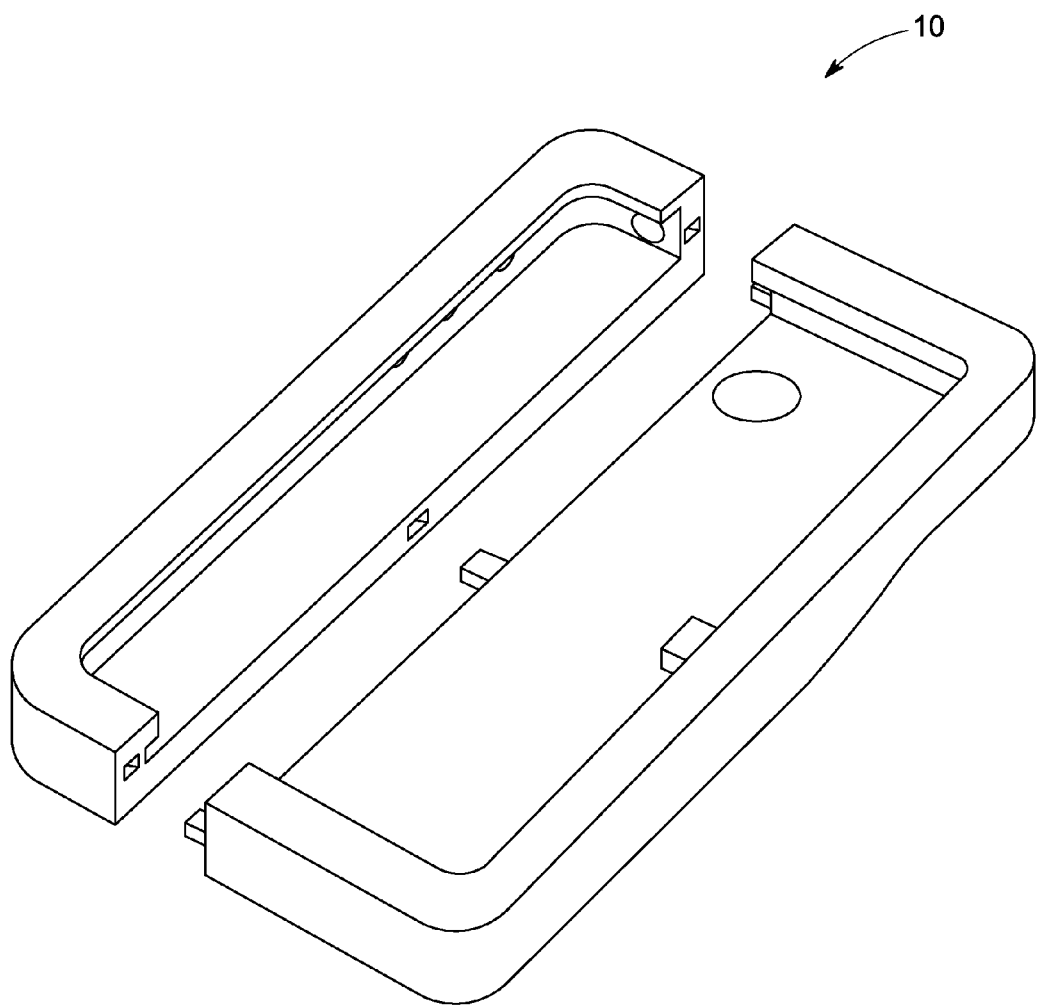
FIG. 7 is a top perspective view of an embodiment of the attachable charger that comes apart laterally according to an alternate embodiment of the present invention.

Still referring to FIGS. 1 through 5, the front frame member 14 comprises a flat rectangular frame, which includes a substantially rectangular opening that is substantially centrally disposed wherein, the rectangular opening will be referred to as "interface window" 22 hereinafter. The interface window 22 enables a user to access the front operable surface of the device 12 which, generally comprises a display screen, a keypad, a touch screen, or a combination thereof. Simply put, the interface window 22 facilitates an interface between the user and the device 12. The attachment receptacle is made of material that is resilient enough to permit the ingress and egress of the device 12 in and out of the attachment receptacle through the interface window 22 as the attachment receptacle is stretched and/or twisted. In another embodiment, instead of the attachment receptacle being resilient, it is designed to come apart longitudinally (as seen in FIG. 6) or laterally (as seen in FIG. 7) upon which, the device 12 is enabled to be inserted into and/or removed from the attachment receptacle. Upon insertion or removal of the device, the parts of the charger that have come apart can be snapped into place.

Figure 4:
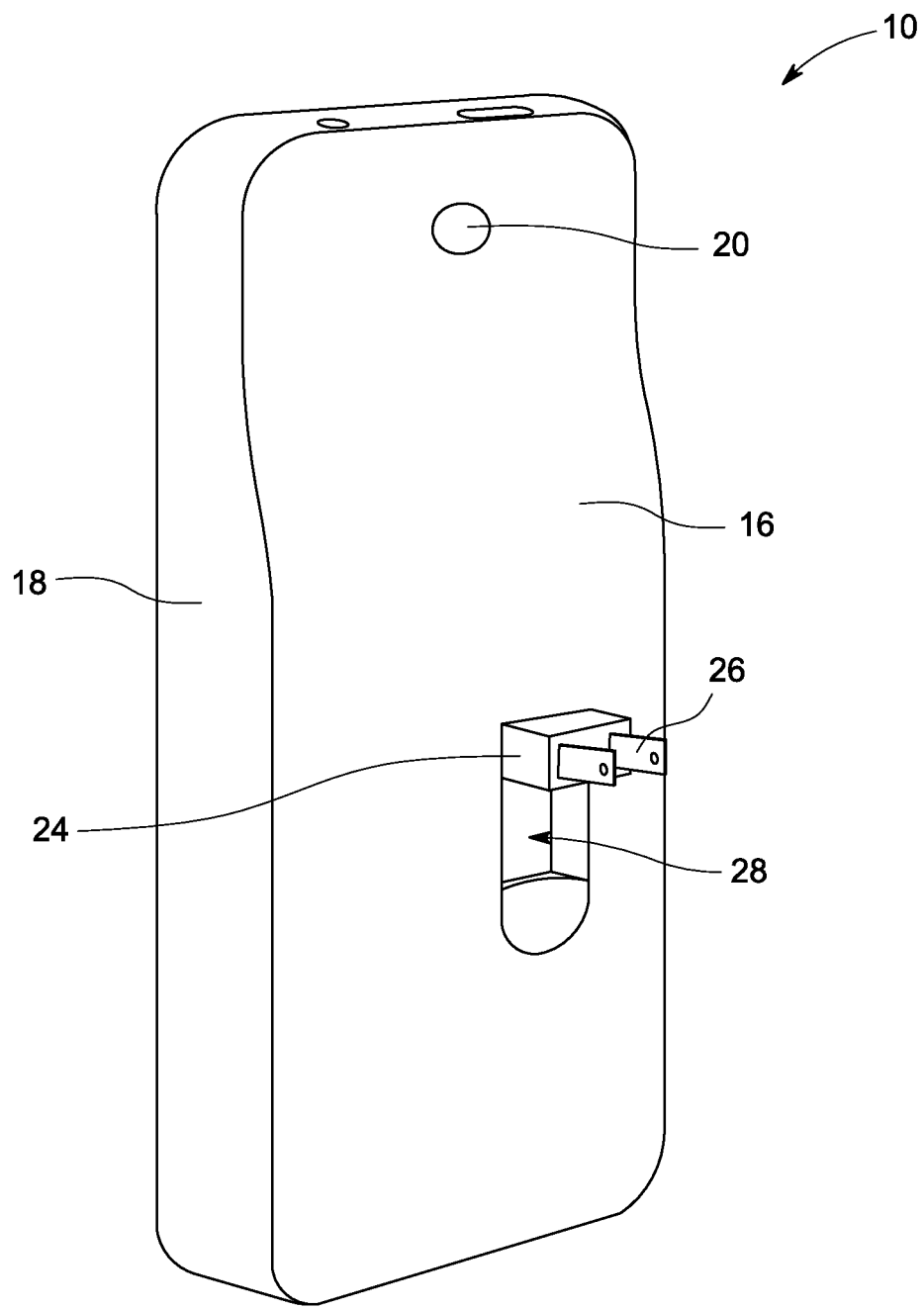
FIG. 4 is a perspective view of the attachable charger with the power plug in open position.
Figure 5:
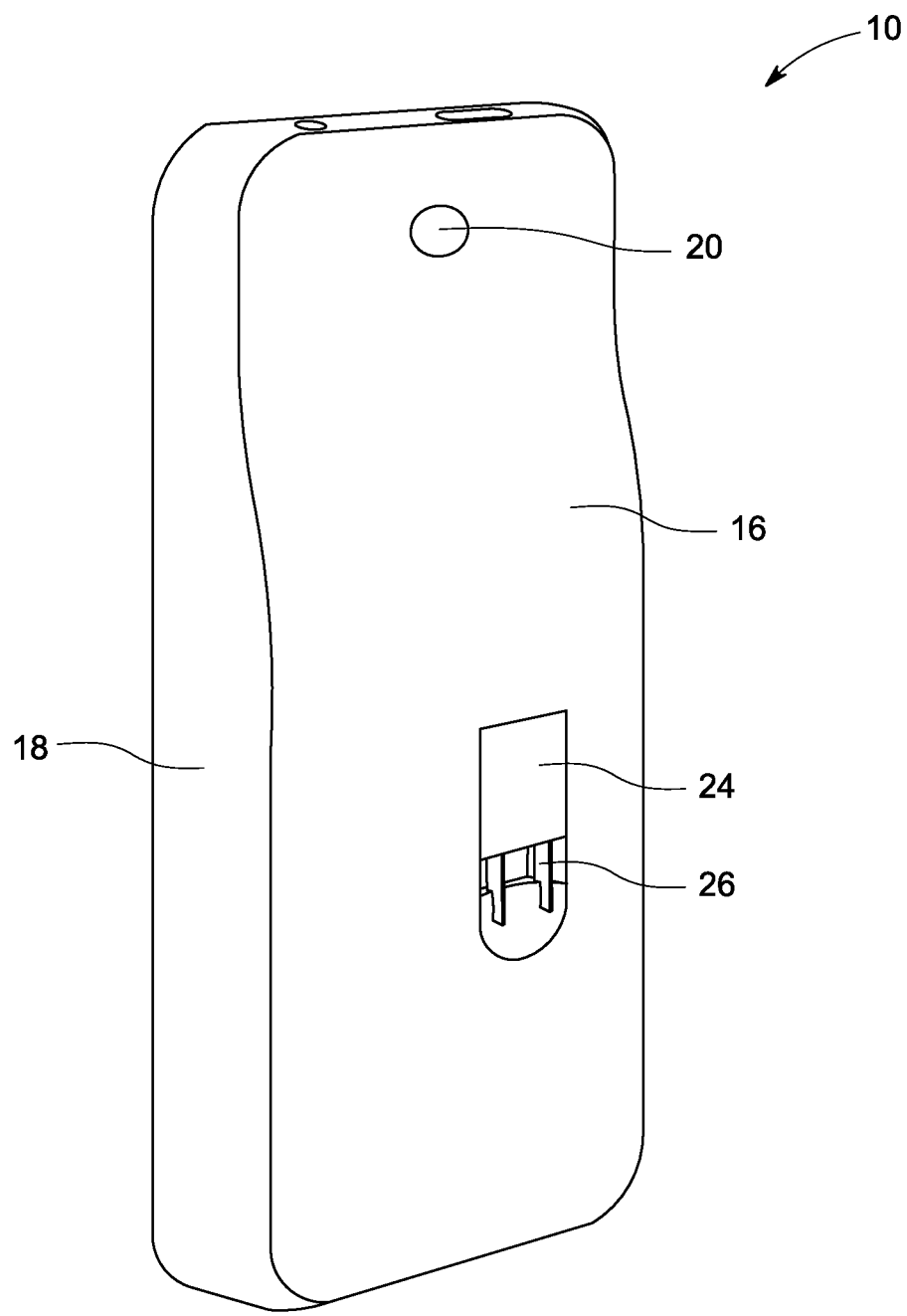
FIG. 5 is a perspective view of the attachable charger with the power plug in closed position.

Referring particularly to FIGS. 4 and 5, the charger 10 further comprises an AC electrical power plug 24 comprising prongs (or pins) 26 for insertion into an AC electrical socket that supplies AC electrical power. The plug 24 extends from the exterior surface of the rear wall member 16 such that, the prongs 26 are perpendicular to the rear wall member 16. In one embodiment, the plug 24 is designed to be angularly movable between an operable open position (FIG. 4), where the prongs 26 are horizontally disposed with respect to the rear wall member 16, and an inoperable closed position (FIG. 5), where the prongs 26 are vertically disposed with respect to the rear wall member 16. In one embodiment, the rear wall member 16 comprises a groove 28 within which the plug 24 in the closed position is received such that, the plug 24 in the closed position is flush with the exterior surface of the rear wall member 16 as seen in FIG. 5.

Figure 8:
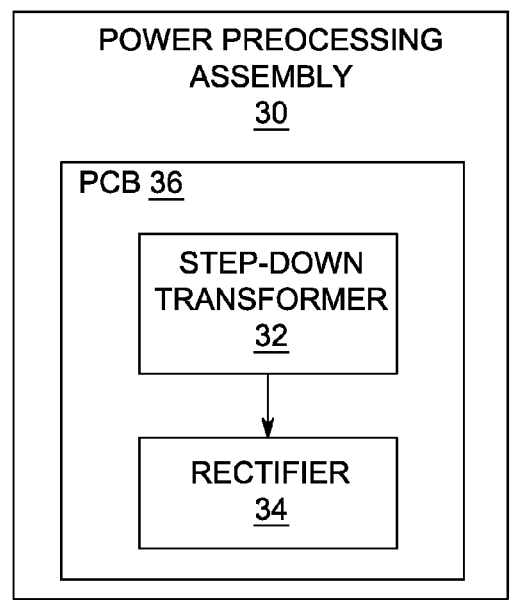
FIG. 8 is a block diagram of processing assembly according to the preferred embodiment of the present invention.

Referring to FIG. 8, the charger 10 further comprises a power processing assembly 30 that resides within the rear wall member 16. More particularly, the processing assembly 30 is disposed within the bottom portion of the rear wall member 16 thus explaining the non-planar exterior surface thereof. The processing assembly 30, as the term suggests, processes the AC electrical power received from the electrical socket into an electrical output that is suitable for charging the device 12. More particularly, the processing assembly 30 comprises a step-down transformer 32 for lowering the magnitude of the AC electrical power received from the plug 24 to a magnitude that is suitable for charging the device 12, which is generally around five Volts. Further, a rectifier 34 is employed for converting the stepped down AC voltage into an equivalent DC voltage. In one embodiment, an additional filter circuit may be employed for cleaning the DC voltage. The transformer 32, rectifier 34, and the other supporting electrical components are laid out on a printed circuit board (PCB) 36 for mechanical support.

Referring again to FIGS. 1 and 2, The charger 10 further comprises connector 38 that extends from the processing assembly wherein, the connector 38 is adapted to be received within the charging port 40 of the device 12 so as to convey the power from the processing assembly to the device 12 resulting in the battery of the device 12 being charged. The connector 38, which basically comprises a charging pin, extends from the interior surface of one of the sidewall members 18 such that, the connector 38 is perpendicular to the corresponding sidewall member 18. The location of the connector 38 is a factor that is dependent on the location of the charging port 40 on the device 12. For example, if the charging port 40 is located at the bottom of the device 12, the connector 38 is obviously located on the bottom sidewall member 18. In another example, if the charging port 40 is located at left side of the device 12, the connector 38 extends from the interior surface of the left sidewall member 18 as can be seen in FIG. 7.

Figure 9:
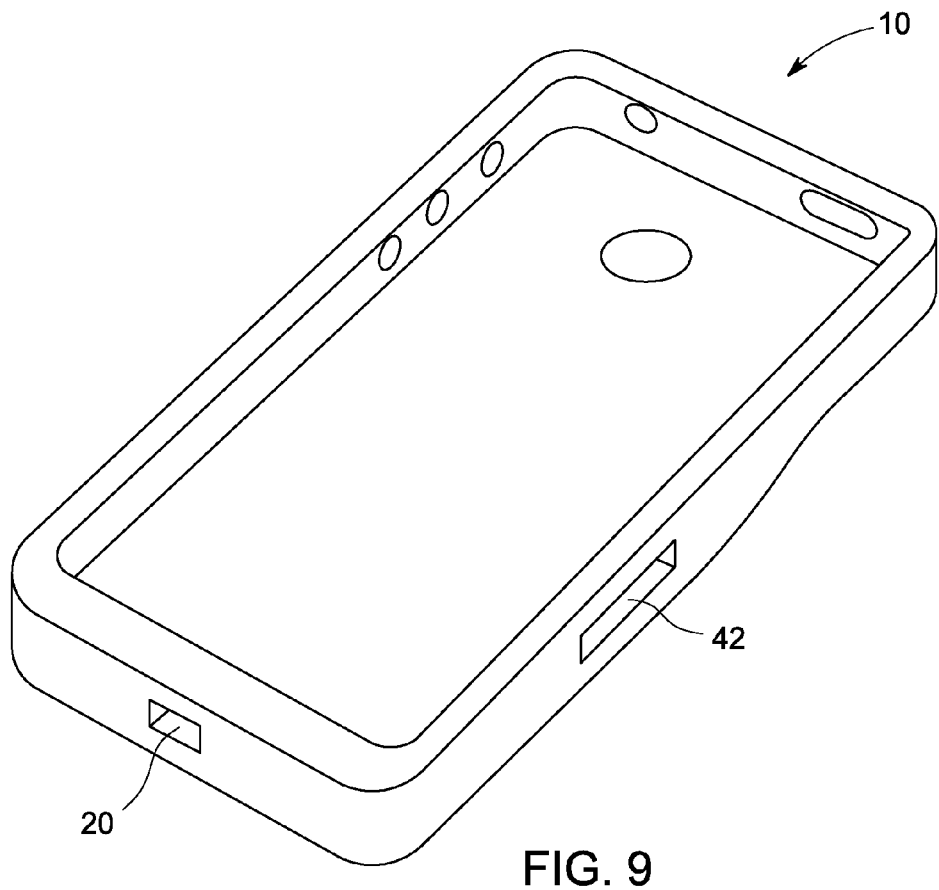
FIG. 9 is a top perspective view of the attachable charger according to an alternate embodiment of the present invention.
Figure 10:
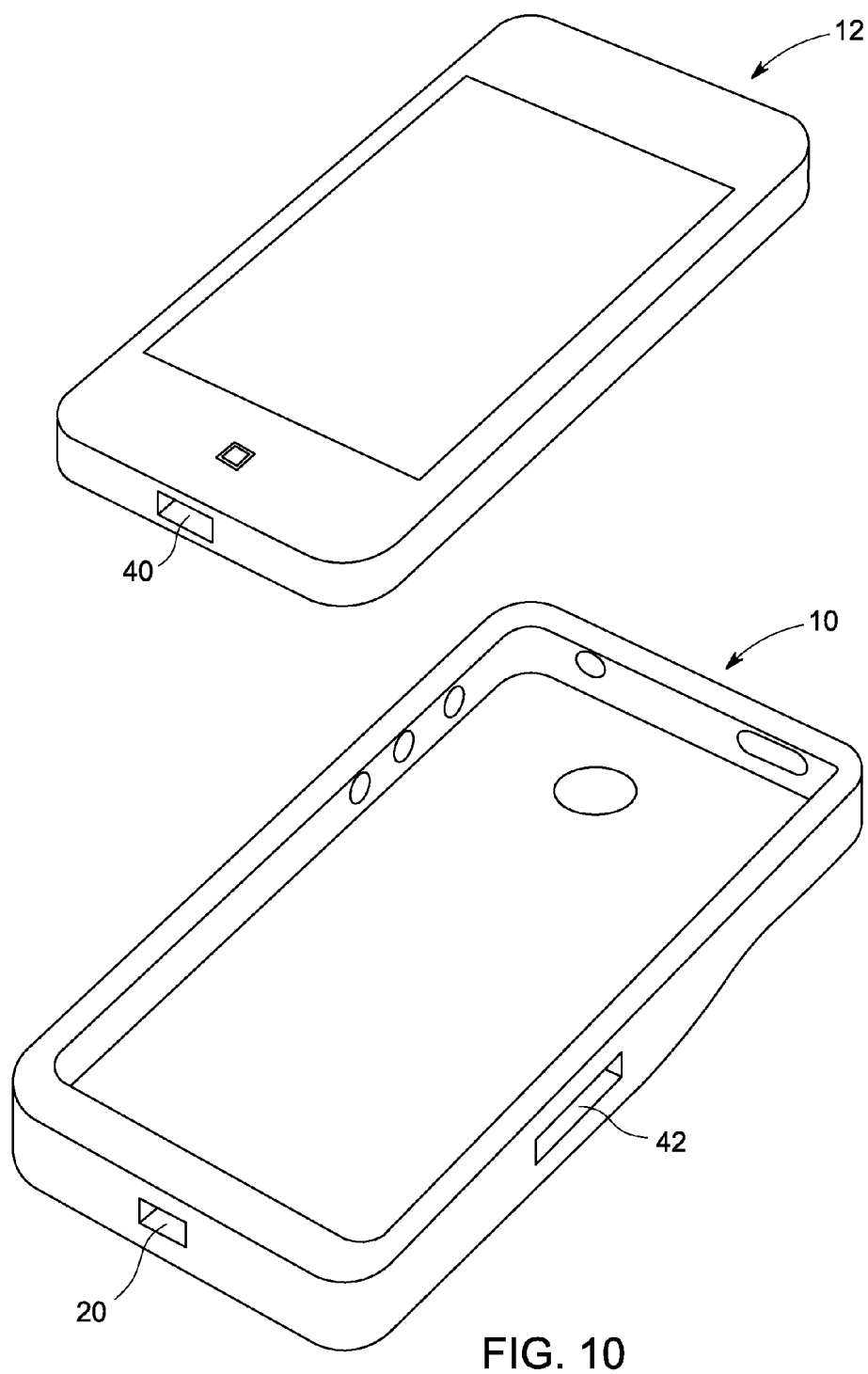
FIG. 10 is an exploded view of the attachable charger and the device according to the embodiment of the present invention shown in FIG. 9.
Figure 11:
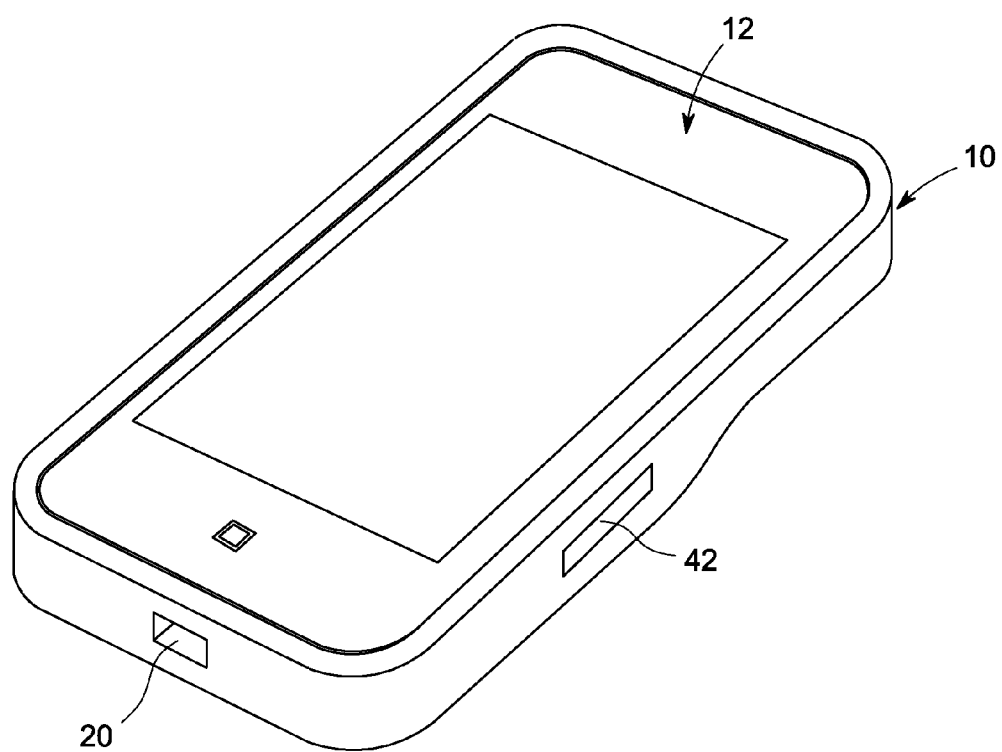
FIG. 11 is a top perspective view of the attachable charger coupled to the device according to the embodiment of the present invention shown in FIG. 9.

Referring to FIGS. 9 through 11, in one embodiment, the connector 38, instead of being a fixed charging pin, comprises a detachable charging cord, is connected between the charging port 40 and a charger port 42 on the charger 10 for conveying the electrical power from the charger 10 to the device 12. More particularly, the charger port 42 extends from the processing assembly such that, the power from the processing assembly is outputted to the charger port 42. Both the charging and charger ports 40 and 42 are accessible from the exterior of the charger 10. More particularly, the charging port 40 is accessible through an opening 20 disposed on the attachment receptacle. A USB cable is preferably used as the charging cord whereby, the charging and charger ports 40 and 42 comprise corresponding USB ports.

Figure 12:
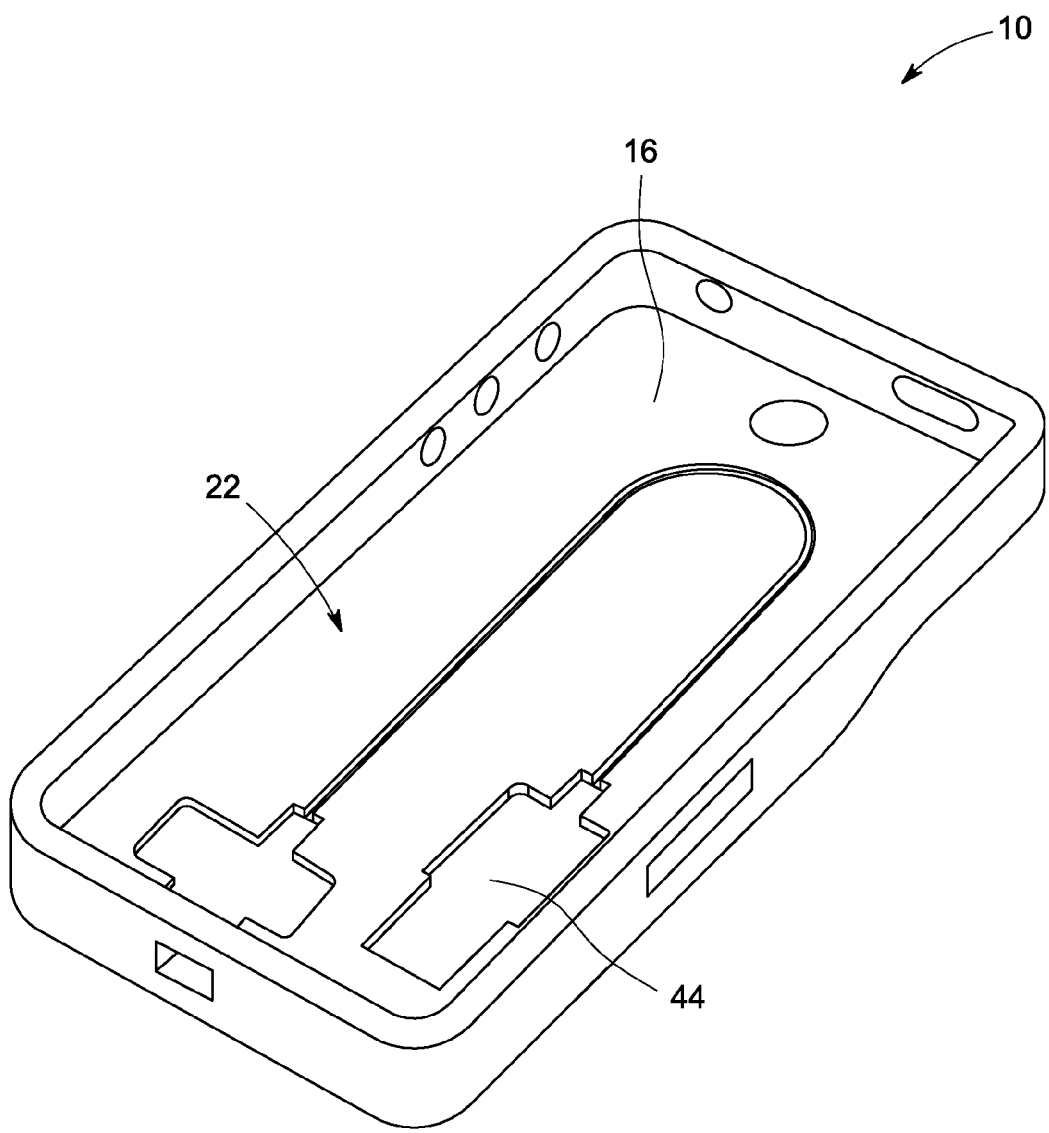
FIG. 12 is a top perspective view of the attachable charger according to another alternate embodiment of the present invention.

Referring to FIG. 12, in one embodiment, the attachment receptacle further comprises a cable receptacle 44 for receiving the charging cord, which, as mentioned earlier, comprises a USB cable. The cable receptacle 44, more particularly, comprises an open receptacle carved on the interior surface of the rear wall member 16 whereby, the rear exterior surface of the device abuts the cable receptacle 44 as the device is received within the attachment receptacle. The contour of the interior surface of the cable receptacle 44 is shaped such that, the USB cable or at least, the pair of heads (or pins) thereof is snugly received therewithin thereby, inhibiting the movement of the USB cable within the cable receptacle 44. The user can only access the contents of the cable receptacle 44 through the interface window 22 and therefore, the device needs to be removed from the attachment receptacle in order for the cable receptacle 44 to be accessed. Now, in order for the device 12 to be charged, the device 12 and the USB cable are to be taken out of the attachment receptacle upon which, the cable is to be connected between the charging and the charger ports 40 and 42 as the plug is inserted into an appropriate power socket.

Alternatively, the device 12 can reside within the attachment receptacle as the charging cord is connected between the charger 10 and the device 12.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall therebetween.

What is claimed is:

1. An attachable charger for a handheld electronic device comprising:
   (a) an attachment receptacle within which the device is snugly received;
   (b) a power plug comprising prongs for insertion into an AC power socket, the power plug extending from the receptacle;
   (c) a power processing assembly for processing the power received at the AC socket into power suitable for charging the device;
   (d) a charger port extending from the processing assembly, for receiving the power outputted from the processing assembly;
   (e) a connector comprising a detachable charging cord with charging pins at either end thereof for connecting between the charger port of the charger and a charging port of the device so as to convey the power from the charger to the device, wherein the charging port and the charger port are accessible from an exterior of the charger and allows charging of the device, when the device is being taken out of the attachment receptacle or placed within the attachment receptacle.

2. The charger of claim 1 being detachable from the device.

3. The charger of claim 1 wherein, the attachment receptacle comprises a rear wall member comprising:
   (a) a rear interior surface that abuts the rear exterior surface of the device as the device is received within the attachment receptacle; and
   (b) a rear exterior surface from which the plug extends perpendicularly;
   the processing assembly disposed between the rear interior and exterior surfaces.

4. The charger of claim 3 wherein, the attachment receptacle further comprises:
   (a) a front frame member disposed opposite to the rear wall member; and
   (b) four side panels extending between the front frame member and the rear wall member so as to snugly receive the device between the front frame member and the rear wall member.

5. The charger of claim 4 wherein, the front frame member comprises an interface window via which, an interface is facilitated between the device and the user thereof; the interface window comprising an opening.

6. The charger of claim 5 wherein, the attachment receptacle is resilient enough for the device to be received therewithin and removed therefrom through the interface window.

7. The charger of claim 4 wherein, the connector extends from one of the side panels such that the connector is located within the attachment receptacle, a free end of the connector is received within the charging port of the device as the device is received within the attachment receptacle whereby, the power from the processing assembly is conveyed to the device through the connector.

8. The charger of claim 3 wherein, the plug is angularly movable between an operable open position, where the prongs are horizontally disposed with respect to the rear exterior surface of the rear wall member, and an inoperable closed position, where prongs are vertically disposed with respect to the rear exterior surface of the rear wall member.

9. The charger of claim 8 wherein, the rear exterior surface of the rear wall member comprises a groove within which the plug in the closed position is received such that, the plug is flush with the surface of the rear wall member.

10. The charger of claim 1 wherein, the processing assembly comprises a step-down transformer for lowering the magnitude of the AC electrical power received by the power plug to a magnitude suitable for charging the device; a rectifier for converting the lowered AC electrical power into DC electrical power; and an additional filter circuit for cleaning the DC electrical power.

11. The charger of claim 1, wherein the charger port is adapted to convey the power from the processing assembly to the connector.

12. The charger of claim 1 wherein, the detachable charging cord comprises a USB cable.

13. The charger of claim 1 wherein, the the attachment receptacle further comprises a cable receptacle for receiving the charging cord.

14. The charger of claim 1 wherein, the charging port of the device is accessible from the exterior of the device through an opening on the attachment receptacle.

* * * * *